United States Patent [19]
Naito

[11] Patent Number: 5,517,258
[45] Date of Patent: May 14, 1996

[54] EYEGLASS FRAME WITH INTERNAL SPRING AND SLIDER ASSEMBLIES

[75] Inventor: Yoshie Naito, Sabae, Japan

[73] Assignees: Kabushiki Kaisha Nakanishi Optical, Osaka; Hideo Yoshida, Fukui, both of Japan

[21] Appl. No.: 343,940

[22] Filed: Nov. 17, 1994

[30] Foreign Application Priority Data

May 16, 1994 [JP] Japan ................................ 6-006530 U

[51] Int. Cl.$^6$ ...................................................... G02C 5/16
[52] U.S. Cl. ............................ 351/113; 351/114; 351/121
[58] Field of Search ..................................... 351/111, 113, 351/114, 121; 16/228

[56] References Cited

FOREIGN PATENT DOCUMENTS

| 0003928 | 9/1979 | European Pat. Off. ................ 351/121 |
| 0096928 | 12/1983 | European Pat. Off. ................. 16/228 |
| 6378969 | 7/1990 | European Pat. Off. ................. 16/228 |

*Primary Examiner*—William L. Sikes
*Assistant Examiner*—James A. Dudek
*Attorney, Agent, or Firm*—Nikaido, Marmelstein, Murray & Oram

[57] ABSTRACT

Disclosed is an eyeglasses frame using temple joints improved according to the present invention. Each hinge assembly is fixed to the joint piece of either side of the frame. It comprises an engagement piece having an axle transversing in its recess end, and a hollow sheath having a lever pivotally fixed to its open end and a spring-biased slider contained therein. The slider has a hook end. The engagement piece is fixed to the joint piece, and the sheath is fixed to the temple. The temple is connected to the front by inserting the hook of the slider in the recess of the engagement piece, and then the temple is pulled to the engagement piece by the resilient force, which is applied to the slider all the time. Thus, the temple-to-front connection is assured to be tight, still permitting the stable opening-and-folding of the temple relative to the front.

2 Claims, 6 Drawing Sheets

FIG. 6
FIG. 7
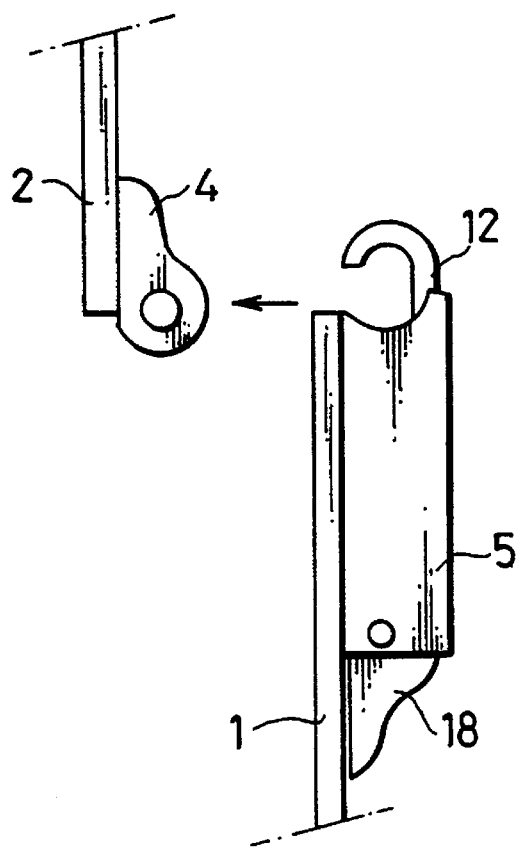
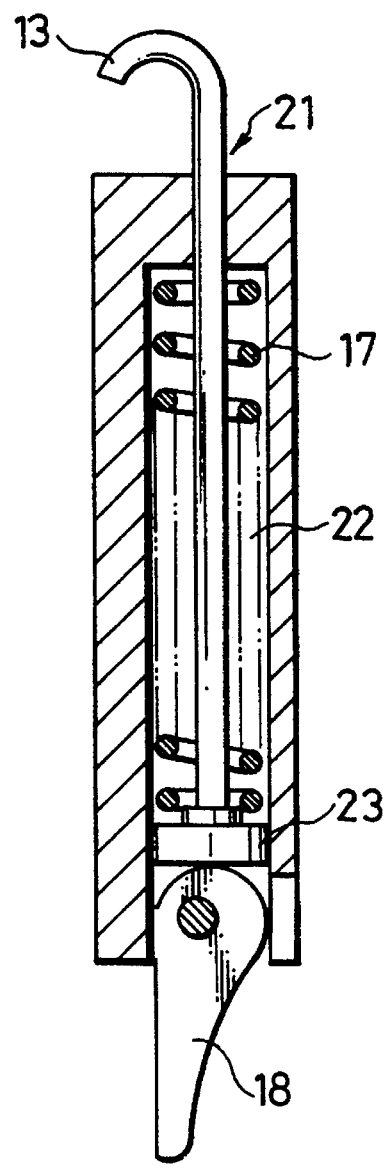

EYEGLASS FRAME WITH INTERNAL SPRING AND SLIDER ASSEMBLIES

BACKGROUND OF THE INVENTION

1. Field of the Invention

The present invention relates to an eyeglass frame, and more particularly to an improved temple joint structure.

2. Description of Related Art

As shown in FIG. 9, a conventional eyeglasses frame has two temples "b" hinged to the opposite sides of a front so as to permit the opposite temples "b" to fold on the front. One joint piece "a" is soldered to either side of the front, and one and the other hinge pieces "c" are soldered to the inside surface of the joint piece "a" and the inside surface of each temple "b" respectively, thereby permitting each temple to rotate with respect to the stationary joint piece. The temples, however, cannot fold on the front stable for a long period; the hinge screws are liable to be loosened, or the associated parts rubbing with each other are liable to wear until the temples have lost correct postures relative to the front, causing displacement of the eyeglasses from the correct position when wearing the eyeglasses on the face.

Hinges are so small that they cannot be made with ease. The hinges do not allow the temple to open wider than 180 degrees relative to the joint piece (see the solid line in FIG. 9). This opening degree is adequate enough to wear the eyeglasses on one's face, and the flexibility of each temple permits the yieldingly bending of the temples enough to enable the eyeglasses to fit on one's face.

Eyeglasses usually fit on one's face for the while after being bought and used. The temples can restore their original postures relative to the front of the frame unless they are deformed perpetually, but the hinges are liable to be loose, causing the rattling of the temples. Also disadvantageously, the conventional temple joint cannot absorb a shock when applied to the frame of the eyeglasses, thus allowing the eyeglasses to fall from one's face, causing the breaking of lenses or deforming of the frame of the eyeglasses.

In an attempt to solve such problems there have been proposed temple joints which permit each temple to open wide more than 180 degrees relative to the joint piece of each end of the front. One example of such temple joint is shown in FIG. 10, and is called "spring hinges". As shown, a stationary hinge piece "d" is soldered to the joint piece "a", allowing a slidable hinge piece "e" to slide a given constant distance to permit the temple "b" to open outward beyond 180 degree position as shown in broken lines.

The temple "b" has a guide piece "f" fixed on its inner surface to guide the slidable hinge piece "e". The slidable hinge piece "e" has a coiled spring inside (not shown), and it is yieldingly compressed when the temple "b" is opened outward beyond 180 degree position, thus applying a returning resilient force to the temple. As may be perceived, the hinge structure having a coiled spring contained in its slidable hinge piece is very complicated, and accordingly an increased number of manufacturing steps are required, and it is expensive. Still disadvantageously, it is easy to malfunction, and is difficult to be fixed once something has been wrong with it.

Spring hinges are likely to be loose as is the case with ordinary hinges, and therefore, the stable attachment of the temples to the front is not assured. A temple hinge structure disclosed in Japanese Utility Model 2-16330(B) is simple in structure, compared with other conventional spring hinges. Each temple has a pin to be caught by a circular-curved piece, which is fixed to the joint piece on either side of the frame. The engagement between the pin and the circular-curved catch is prevented from loosing by an associated spring. The pin of the temple, however, cannot be engaged with the circular-curved catch of the joint piece with ease. What is worse is: the circular-curved catch of the joint piece is fragile; even if the circular-curved catch is made of a hardened metal, it is annealed when heated by soldering to the joint piece. When the temples are opened outward, the tip of the circular-curved catch is often caught by the circular recess of the sheath, thus preventing the smooth opening of the temple.

SUMMARY OF THE INVENTION

One object of the present invention is to provide an improved temple hinge structure of the type disclosed in Japanese Utility Model 2-16330(B), using no hinges, and being simple and easy in assembling, and being capable of functioning as spring-biased hinges.

To attain this object an eyeglasses frame comprising a front and two temples hinged to the opposite sides of the front so as to permit the temples to fold on the frame is improved according to the present invention in that it has two hinge assemblies fixed to the joint pieces of the opposite sides of the frame, each assembly comprising an engagement piece having an axle transversing in its recess end, said engagement piece being fixed to the joint piece of either side of the frame, and a hollow sheath having a lever pivotally fixed to one end and a spring-biased slider having a hook end, said slider being slidably fitted in the hollow space of the sheath, and connected to the engagement piece with its hook end catching the axle of the engagement piece, the sheath being fixed to either temple with the other end of the sheath abutting the engagement piece.

According to one aspect of the present invention the sheath may have a longitudinal slot to permit a rectangular slider plate to fit and slide thereon and a cylindrical hollow space extending from its open end and extending short of the closed end to accomodate a coiled spring. Also, the sheath may have a lever pivotally fixed to its open end. The rectangular slider plate have a hook at one end and a space cut therein to contain a coiled spring. The rectangular plate having the coiled spring fitted in its space is inserted in the sheath by fitting one longitudinal edge of the rectangular plate in the longitudinal slot of the sheath, and by fitting the coiled spring in the cylindrical space of the sheath. The coiled spring extends between the bottom end of the cylindrical space and the lever pivotally fixed to the open end of the sheath. Rotation of the lever about its pivot in one direction will cause the hooked end of the slider to appear from the sheath by compressing the coiled spring, and rotation of the lever about its pivot in the other direction will cause the hooked end of the slider to enter the sheath by permitting the coiled spring to return to its stress-free length. Thus, the hooked end of the slider when catching the engagement piece will pull the engagement piece under the influence of the coiled spring so as to connect the temple to the joint piece without permitting their connection to be loose.

According to the other aspect of the present invention the sheath may have a cylindrical space extending short of the closed end of the sheath, and a slider may be a rod having a hook integrally connected to one end and a collar integrally connected to the other end of the rod. A coiled spring is fitted in the longitudinal hollow space, extending between the bottom of the cylindrical space and the collar of the slider, and the hook of the slider appears from the sheath. The lever is pivotally fixed to the open end of the sheath to abut the collar of the slidable rod.

In either embodiment the slider of the sheath can rotate about the axle of the engagement piece, thereby permitting the temple to fold on the front and open more than 180 degrees outward relative to the joint piece while compressing the coiled spring. When the temple is released, it can return to its original position in which it is in alignment with the joint piece. The resilient force is applied to the slider all the time, and therefore, the temple-to-joint connection cannot be loose. The temple can be attached and detached from the sheath simply by rotating the lever about its pivot.

Other objects and advantages of the present invention will be understood from the following description of frames of eyeglasses according to preferred embodiments of the present invention, which are shown in accompanying drawings:

BRIEF DESCRIPTION OF THE DRAWINGS

FIG. 3c is a longitudinal section of the engagement piece taken along the line A—A in FIG. 3a;

FIG. 6 shows how the hooked end of the slider is caught by the axle of the engagement piece;

FIG. 7 is a longitudinal section of a sheath assembly for an eyeglasses frame according to a second embodiment of the present invention;

DESCRIPTION OF THE PREFERRED EMBODIMENTS

Figure 1:
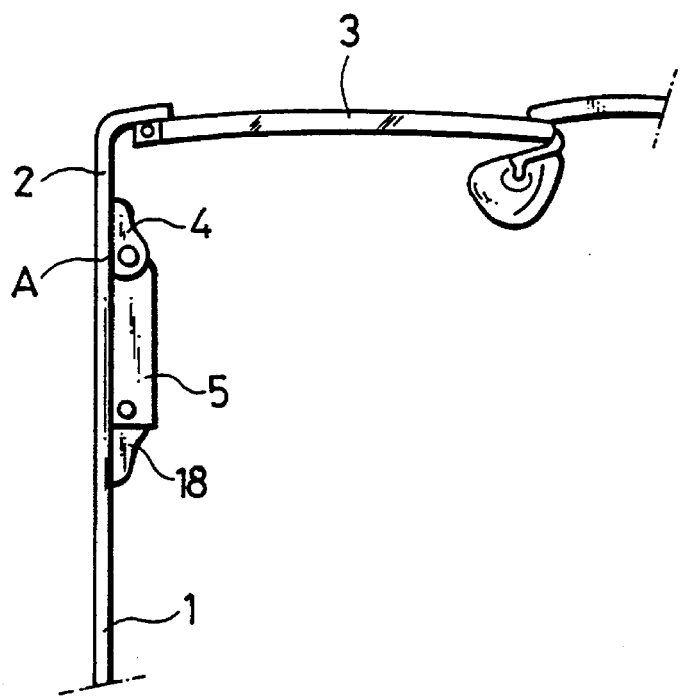
FIG. 1 is a fragmental plane view of an eyeglasses frame according to a first embodiment of the present invention.

Referring to FIG. 1, a frame according to a first embodiment of the present invention comprises a temple 1, a joint piece 2, a rim 3, an engagement piece 4 and a sheath 5. The joint piece 2 is soldered to the rim 3, and the engagement piece 4 is soldered to the joint piece 2. The sheath 5 is soldered to the temple 1. The frame is made of a metal, and therefore, the joint piece 2 is used. If the frame is made of a resin, the engagement piece 4 is embedded in an extension of the rim 3 of the front.

Figure 2A:
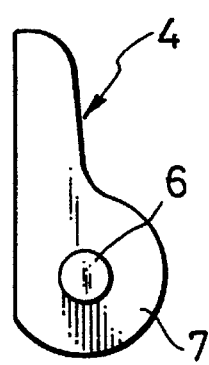
FIGS. 2a and 2b are side and plane views of an engagement piece.
Figure 2B:
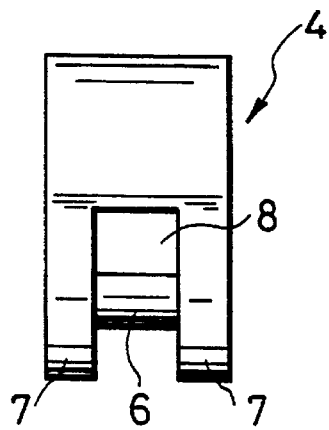
Figure 2C:
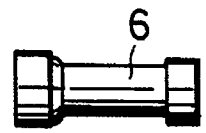
FIGS. 2c and 2d show examples of axles for engagement pieces.
Figure 2D:
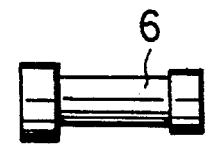

FIGS. 2a and 2b show the engagement piece 4, which looks like one part of the hinge. It has an axle 6 traversing the recess 8 defined by opposite support extensions 7 and 7. The hook of a slider which is described later, is put in the recess 8 of the engagement piece 4. Thanks to the supporting of the axle 6 at its opposite ends the axle cannot be annealed when the engagement piece 4 is heated by soldering to the joint piece 2, and therefore, its strength cannot be reduced. Also, after soldering the engagement piece 4 to the joint piece 2, the axle 6 may be press-fitted in the holes made in the engagement piece 4. The axle 6 can take a desired shape such as stepped axles as shown in FIGS. 2c and 2d, or a threaded axle.

Figure 3A:
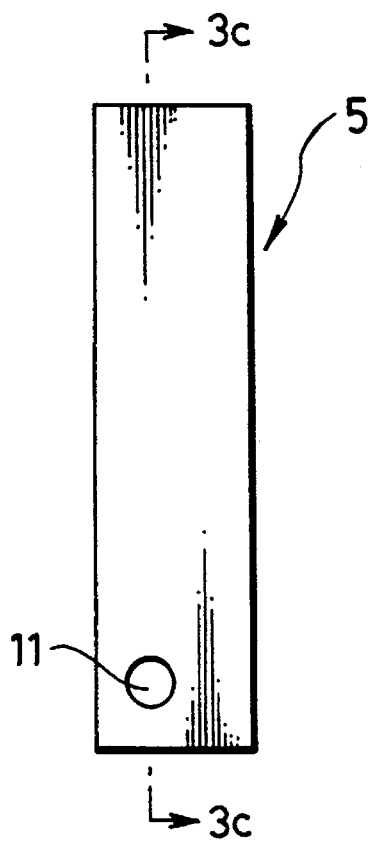
FIGS. 3a and 3b are side and end views of an engagement piece.
Figure 3C:
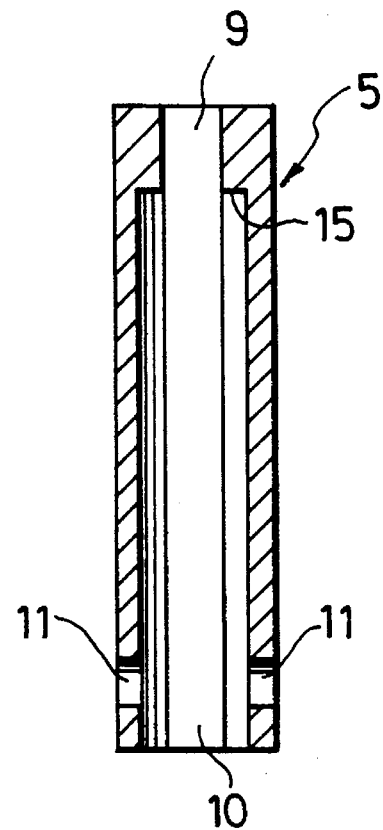
Figure 3B:
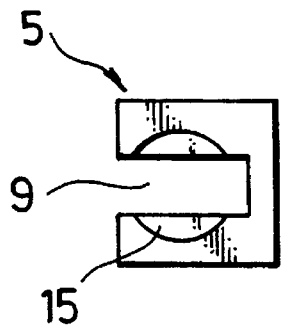

FIGS. 3a, 3b and 3c show a hollow sheath 5, which has a longitudinal slot 9 extending its full length, and a cylindrical space 10 extending from one end and short of the other end of the sheath. The diameter of the cylindrical space is larger than the width of the slot 9. A small hole 11 is made in the open end of the sheath 5. A pivot is inserted to fix a lever as later described.

Figure 4A:
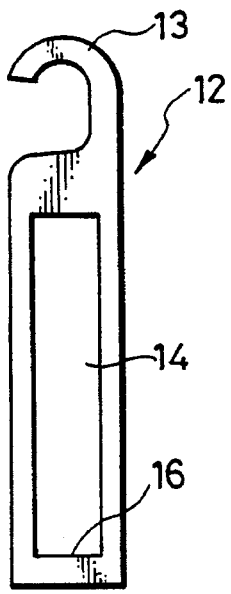
FIGS. 4a and 4b are front and side views of a slider.
Figure 4B:
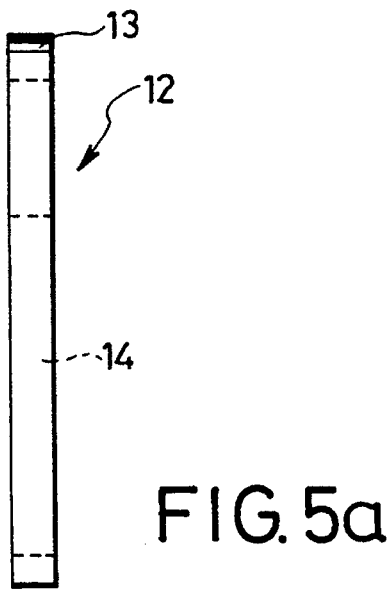

FIGS. 4a and 4b show a slider 12, which is a rectangular plate to slidably fit in the longitudinal slot 9 of the sheath 5. As seen from the drawing, the rectangular plate has a rectangular space 14 cut therein and a hook 13 integrally connected to its end.

The sheath 5 having the slider 12 slidably fitted in its slot 9 is soldered to the temple 1. A coiled-spring is fitted in the rectangular space 14 of the slider 12, and then, the slider 12 is inserted in the sheath 5 until the coiled spring abuts on the bottom 15 of the cylindrical space 10, thus extending between the bottom 15 of the cylindrical space and the rear end 16 of the rectangular space 14 of the slider 12.

Figure 5A:
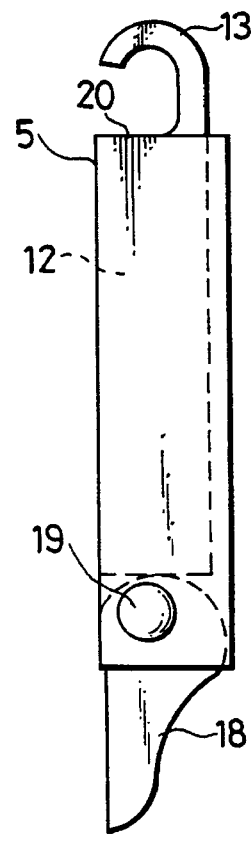
FIG. 5a is a front view of a sheath assembly having a spring-biased slider fitted therein.
Figure 5B:
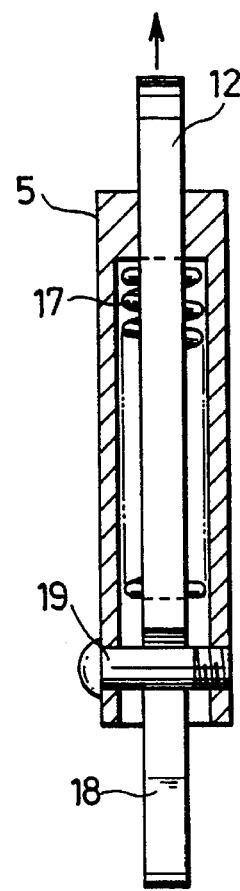
FIG. 5b is a longitudinal section of the sheath assembly.

FIG. 5 shows how the slider 12 and the coiled spring 17 are inserted in the sheath 5. When the slider 12 is pushed in the direction as indicated by arrow, the coiled spring 17 is compressed until the hook 13 appears from the sheath 5, thereby permitting the hook 13 to catch the axle 6 of the engagement piece 4 (see FIG. 6). A lever 18 is pivotally fixed to the rear end of the sheath 5 by a pivot pin 19, which is inserted in the apertures 11 made in the rear end of the sheath 5. The lever 18 has an ever increasing radius r or R extending from an eccentric center, and therefore, the counter clockwise rotation of the lever 18 in FIG. 5a pushes the slider 12 against the coiled spring 17 until the hook 13 appears from the sheath 5.

After catching the axle 6 of the engagement piece 4 the ever 18 is rotated to its original position, thereby permitting the coiled spring 17 to extend to its full, stress-free length. Then, the hook 13 of the slider 12 connects fixedly the sheath 5 to the engagement piece 4, guaranteed free of loose connection. As seen from FIG. 6, the abutting end of the engagement piece 4 may be circular in shape, and the abutting end of the sheath 5 may be counter circular. The temple 1 can rotate smoothly about the axle 6 of the engagement piece 4 without fear of loosening thanks to the continuous application of the resilient force to the slider 12. The temple 1 can be opened still outward from the position shown in FIG. 1 in which the temple 1 is aligned with the joint piece 2 by inclining the temple 1 on the abutting end A of the joint piece 2, causing the slider 12 to move somewhat against the coiled spring 17, which is further compressed. Therefore, the releasing of the temple 1 will permit it to return to its original position in which the temple 1 is aligned with the joint piece 2.

FIG. 7 shows another example of the sheath-and-slider assembly using a rod-shaped slider having a hook 21 on one end and a collar on the other end thereof. The collar 23 is detachably attached to the rod, thereby permitting the attaching and detaching of the coiled spring 17 therearound. The sheath 5 has a coiled spring 17 contained in its hollow space 22, and a lever 18 is pivotally fixed to its open end.

Figure 8A:
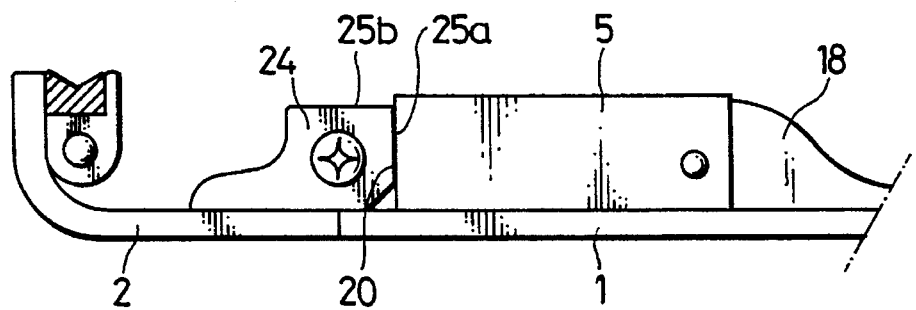
FIGS. 8a, 8b and 8c show how the temple can be folded on the front.
Figure 8B:
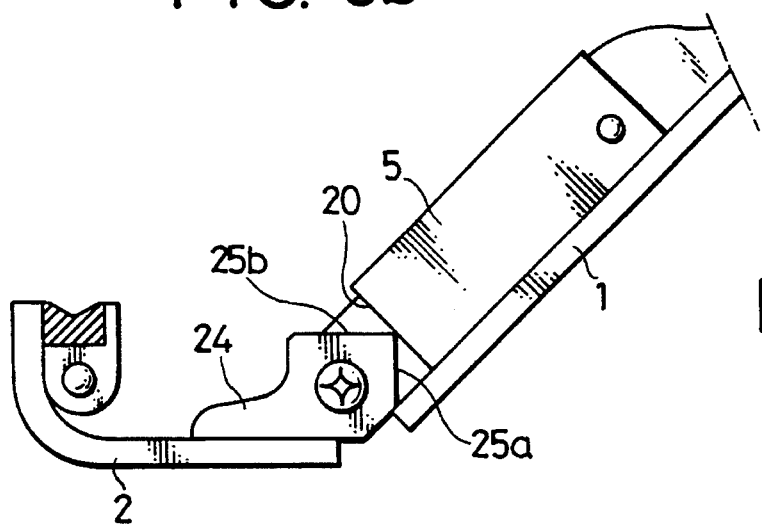
Figure 8C:
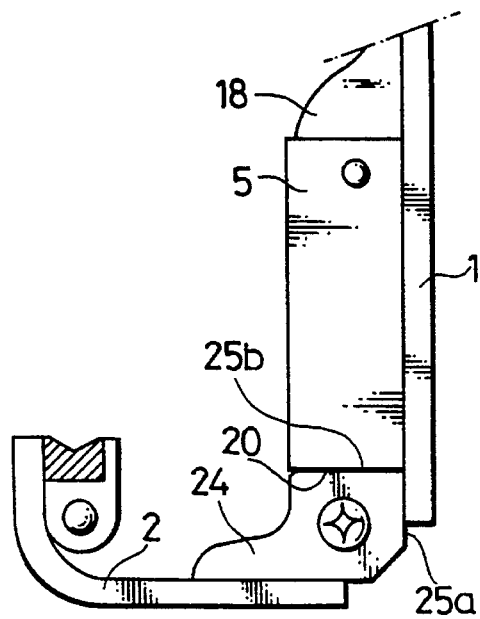
Figure 9:
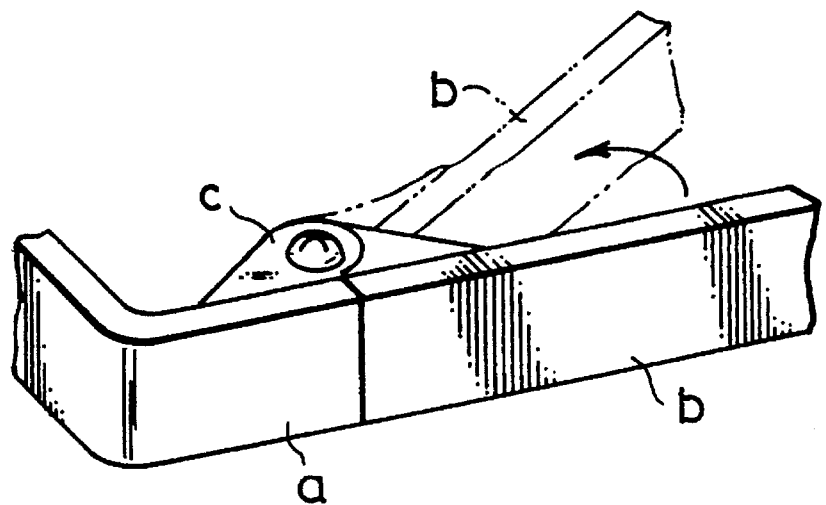
FIG. 9 is a fragmentary perspective view of a conventional hinged temple-joint.
Figure 10:
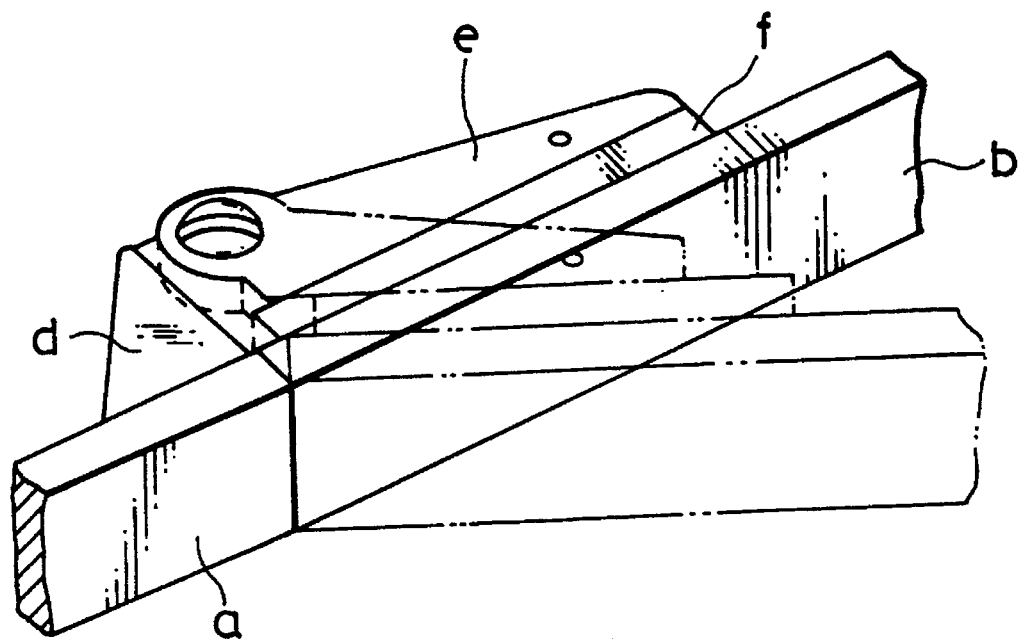
FIG. 10 is a fragmentary perspective view of another conventional hinged temple-joint.

FIGS. 8a, 8b and 8c show how the temple 1 folds on the front. As seen from the drawings, the engagement piece 24 has two sides 25a and 25b defining an angle of 90 degrees. As seen from FIG. 8a, the temple 1 is opened to be in alignment with the joint piece 2 with the end surface 20 of the sheath 5 abutting against the front side 25a of the engagement piece 4. FIG. 8b shows that the temple 1 is inclined at 45 degrees relative to the joint piece 2 on the way to the front, and FIG. 8c shows that the temple 1 is folded on the front. As seen from FIG. 8e, the end surface 20 of the sheath 5 comes to abutment with the side surface 25b of the engagement piece 24, thus holding the temple 1 in the folding position stable. When the temple 1 passes the 45 degree posture as shown in FIG. 8b, the temple 1 snaps shut under the influence of the coiled spring.

As may be understood from the above, the temple joint according to the present invention provides the following advantages: the structure is simple, compared with the conventional spring hinges; the engagement piece and the sheath can be assembled with ease simply by rotating the lever; the springbiased slider assures that the connection between the engagement piece and the sheath is tight all the time, permitting the stable folding and unfolding operation; and the axle cannot be annealed to lose its strength when the engagement piece is soldered to the joint piece, and the engagement piece can be embedded in the joint if the frame is made of a resin.

I claim:

1. An eyeglasses frame, comprising:

a front;

two temples hinged to opposite sides of the front so as to permit the temples to fold on the frame;

two hinge assemblies disposed on the opposite sides of the frame, each hinge assembly comprising an engagement piece having an axle transversely disposed in a recess end thereof, said engagement piece being attached to a joint piece on one side of the frame;

a hollow sheath having a lever pivotally fixed to one end of one of said temples; and a spring-biased slider cooperating with said sheath and having a hook end, said slider being slidably fitted in a hollow space of the sheath, and being connected to the engagement piece with the hook end thereof engaging the axle of the engagement piece, the sheath being attached to the temple such that another end of the sheath abuts the engagement piece.

2. A resin eyeglasses frame, comprising;

a front;

two temples hinged to opposite sides of the front so as to permit the temples to fold on the frame;

two hinge assemblies disposed on the opposite sides of the frame, each hinge assembly comprising an engagement piece having an axle transversely disposed in a recess end thereof, said engagement piece being embedded in one side of the frame;

a hollow sheath having a lever pivotally fixed to one end of one of said temples; and a spring-biased slider cooperating with said sheath and having a hook end, said slider being slidably fitted in a hollow space of the sheath, and being connected to the engagement piece with the hook end thereof engaging the axle of the engagement piece, the sheath being attached to the temple such that another end of the sheath abuts the engagement piece.

* * * * *